United States Patent Office 3,476,776
Patented Nov. 4, 1969

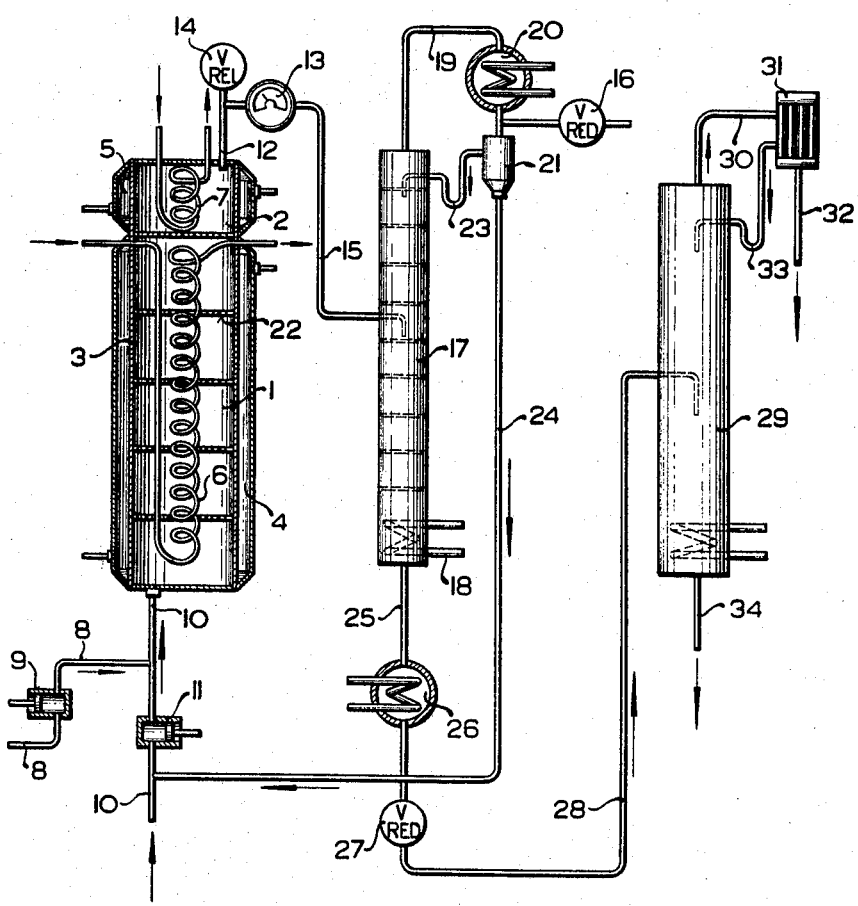

3,476,776
PROCESS FOR THE MANUFACTURE OF ALKANE EPOXIDES
Kurt Sennewald, Knapsack, near Cologne, Heinz Erpenbach, Surth, near Cologne, Heinrich Rehberg, Hermulheim, near Cologne, and Günter Viertel, Bruhl, near Cologne, Germany, assignors to Knapsack Aktiengesellschaft, Knapsack, near Cologne, Germany, a corporation of Germany
Filed Oct. 12, 1965, Ser. No. 495,184
Claims priority, application Germany, Oct. 22, 1964, K 54,318
Int. Cl. C07d 1/08
U.S. Cl. 260—348.5                 6 Claims

ABSTRACT OF THE DISCLOSURE

A process for the continuous manufacture of expoxides from olefins, which are gaseous at ambient temperature and under atmospheric pressure, by oxidation with peracetic acid in the liquid phase comprises reacting in two reaction stages an about 10–40% by weight solution of peracetic acid, which is free from water and mineral acid but may be stabilized, in an inert organic solvent with an appropriate olefin in the molar ratio of 1:4 to 5, at a temperature of about 20 to about 100° C. and under a pressure of about 3 to about 100 atmospheres absolute, by allowing the peracetic acid, in the first reaction stage, to act upon the olefin at a temperature below about 60° C. for a period of time sufficient to transform about 55–80% by weight of the peracetic acid. Thereafter completing the reaction, in the second reaction stage, at a temperature above 60° C. and within a period of about 5 to 20 minutes so as to obtain a maximum peracetic acid conversion rate, then expanding the reaction mixture and expelling olefin in excess by evaporation, recycling the expelled olefin and reacting it again with peracetic acid, and isolating the epoxy compound from the residue by subjecting it to fractional distillation.

---

The present invention relates to a process for the manufacture of alkane epoxides by reacting an olefin, which is gaseous under normal conditions, with peracetic acid.

It is known that alkane epoxides, such as propylene oxide or butylene oxide and the like, can be prepared by the process described in German specification 1,019,307, wherein an excess proportion of an appropriate olefin is reacted in the liquid phase, at a temperature of 25 to 200° C., with an aldehyde monoperacylate dissolved e.g. in acetone. This process gives, per mol epoxide, one mol aldehyde and one mol carboxylic acid as by-products. In order to render the process more economic, it is necessary to isolate the epoxide and in addition thereto the aldehyde from the reaction mixture, and to use the aldehyde again for making aldehyde monoperacylate. Aldehyde monoperacylates are, however, known to have explosive properties and manipulation thereof is therefore not harmless which means that in most cases this oxydant will not be employed.

A further process for making epoxide is described in U.S. specification 2,977,374 which comprises reacting an olefin with peracetic acid in continuous manner in the liquid phase, at a temperature of 0 to 150° C. and for a period of at most 45 minutes, the reaction being carried out in a reaction tube of certain dimensions. The peracetic acid and olefin are generally used in a molar ratio of 1:20 and preferably of 1:10. According to a further feature described in that specification, the process is conveniently carried out in a stainless steel or aluminum reactor. Using the olefin, per mol peracetic acid, in a molar excess proportion of 10 to 20 times the proportion of peracetic acid is an energetically very disadvantageous feature with respect to the working up of the reaction mixture and recovery of unreacted olefin for epoxidation because the olefin, recovered while expanded during the work-up, must again be compressed before it can be reacted further with peracetic acid. Bearing in mind that large olefin proportions are continuously cycled, it is necessary to use appreciable amounts of energy. This is an essential factor to consider upon evalution of the industrial efficiency of the process.

The present invention is based on a plurality of unexpected observations which have been made during the manufacture of epoxides by reacting olefins with peracetic acid and which permit considerable improvements to be realized as regards the course of the reaction and yield of product desired to be obtained.

The process of the present invention for the continuous manufacture of epoxides from olefins, which are gaseous at ambient temperature and under atmospheric pressure, by oxidation with peracetic acid in the liquid phase comprises reacting in two reaction stages an about 10–40% by weight solution of peracetic acid, which is free from water and mineral acid but may be stabilized, in an inert organic solvent with an appropriate olefin in the molar ratio of 1:4 to 5, at a temperature of about 20 to about 100° C. and under a pressure of about 3 to about 100 atmospheres absolute, by allowing the peracetic acid, in the first reaction stage, to act upon the olefin at a temperature below about 60° C. for a period of time sufficient to transform about 55–80% by weight of the peracetic acid, and thereafter completing the reaction, in the second reaction stage, at a temperature above 60° C. and within a period of about 5 to 20 minutes so as to obtain a maximum peracetic acid conversion rate, then expanding the reaction mixture and expelling olefin in excess by evaporation, recycling the expelled olefin and reacting it again with peracetic acid, and isolating the epoxy compound from the residue by subjecting it to fractional distillation.

Olefinic starting components suitable for use in carrying out the epoxidation reaction include e.g. propylene, butene-1, butene-2, isobutylene or 3-methylbutene-1. These are reacted with peracetic acid diluted with an inert organic solvent, an ester, such as methylacetate or ethylacetate, of low boiling point and forming an azeotrope with water being preferably used. Ketones, such as acetone, which are known to be good solvents for peracetic acid, can also be employed. As opposed to the esters, the ketones are, however, found to be unstable under the reaction conditions employed, especially when the reaction mixture is continuously cycled. Thus, it has been ascertained that ketones as the solvent incur increased carbon dioxide formation. This reduces the amount of active oxygen present and results in increased formation of useless residue. As peracetic acid has the property occasionally to undergo spontaneous decomposition even in slightly dilute form, it is convenient to use such acid in a concentration of about 10 to 40% by weight, referred to the amount of solvent. Peracetic acid solutions having a peracetic acid content of more than 40% by weight no longer admit of sufficiently safe manipulation, whilst dilute solutions with a peracetic acid content of less than 10% by weight incur commercially intolerable distillation expenses during the work-up, due to the large proportions of solvent present.

The peracetic acid used should be free from water and mineral acid, but it may contain some acetic acid. The peracetic acid preferably contains a molar deficiency of acetic acid. Water and mineral acid incur the formation of considerable amounts of by-products, e.g., glycols or glycol acetates, and presence thereof should therefore be avoided.

A further feature of the present invention resides in the reaction of the reaction components in two reaction stages at different reaction temperatures. In order to avoid decomposition of the thermally unstable peracetic acid, it is advantageous in the first reaction stage, in which the bulk of the peracetic acid undergoes reaction, to maintain a relatively low reaction temperature, preferably of 30 to 50° C. In the second reaction stage, the temperature is increased to about 70–90° C. so as to complete the reaction. At this higher range of temperatures, which accelerate the reaction, the sojourn time of the reaction mixture in that second stage is advantageously limited to about 5 to 10 minutes. This feature enables the peracetic acid to react substantially quantitatively with the olefin, while partial decomposition of the acid is essentially avoided. Distillative workup of the reaction mixture, where unreacted olefin in excess is first separated, is achieved by reducing the pressure under which the reaction mixture is maintained to about 1 to 20 atmospheres absolute.

Maintaining a definite molar ratio of peracetic acid to olefin of 1:4–5 is of special importance for the industrial efficiency of the process as has already been mentioned above. The molar ratio as defined ensures an almost complete conversion of peracetic acid and an unexpected good yield of epoxide. Using the olefin in a proportion larger than corresponds to the above ratio produces neither better yields nor conversion rates, but more processing expense will be incurred for handling a large excess of olefin with solely negative effects on the commercial efficiency of the process.

A special process feature for increasing the epoxide yield comprises using a mixture of sodium tripolyphosphate and quinoline as an especially efficient stabilizer for peracetic acid. This stabilizer enabled, e.g., in the production of propylene oxide, the yield to be increased from initially 77.9% to 90.1%, referred to the amount of peracetic acid used. A concentration of about 0.01 to 1% by weight, preferably 0.01 to 0.05% by weight, of each stabilizer component is sufficient to produce a good stabilizing effect.

It has finally been found that also the epoxide yields are influenced by the construction material used for making the reactor. Alloyed steels, such as V4A-steel (stainless steel) and aluminum have generally proved suitable as construction material for making the reactor, which are resistant to the corrosive action displayed by the reaction mixture. Reactors lined with aluminum permitted obtaining better epoxide yields than reactors solely made of stainless steel.

An exemplary mode of carrying out the process of the present invention will now be described with reference to the accompanying flow scheme.

A tubular stainless steel reactor 3 having an inside wall lined with aluminum of more than 99% purity, subdivided in two separate reaction chambers 1 and 2, heatable from the outside by means of heating jackets 4 and 5 and heatable from the inside by means of aluminum-lined coils 6 and 7, was charged through line 8 and pump 9 with a 10–40% by weight peracetic acid solution and was charged through line 10 and pump 11 with an olefin under a pressure of 3 to 100 atmospheres absolute with a molar ratio of the reaction components of 1:4–5. The reaction which took place in a first stage in reaction chamber 1 at a temperature below 60° C., preferably about 30–50° C., was allowed to proceed for a period sufficient to transform about 55–80% by weight of the peracetic acid, the rate of conversion being determined by occasional sampling. Reaction chambers 1 and 2 have inserted screening plates 22, made, e.g., of aluminum, which are spaced from one another and intended to avoid reflux and diffusion of the reaction components. Reaction mixture leaving reaction chamber 1 was treated in a second stage in reaction chamber 2 at a temperature above 60° C., advantageously 70–90° C., for a period of time of about 5–20 minutes to complete the reaction. Through line 12 with inserted manometer 13 and pressure valve 14 disposed at the head of reactor 3, reaction mixture was withdrawn at the same rate as starting components were supplied to the reactor 3; and the reaction mixture was caused to travel into distilling column 17 under a reduced pressure of about 1 to 20 atmospheres absolute, which had been adjusted by means of reducing valve 16. In the sump portion of distilling column 17, the reaction mixture was heated by means of heater 18 at a temperature high enough to distill off olefin in excess at the head of the column through line 19 and successively to condense it in cooler 20. Condensed matter was initially collected in tank 21 and a portion thereof was then refluxed through line 23 into column 17. The bulk of the condensed olefin flowed through lines 24 and 10 to reactor 3 to be reacted again with the peracetic acid. Crude epoxide obtained in the sump portion of column 17 was withdrawn through line 25, cooled in cooler 26 and, after the pressure had been reduced by means of reducing valve 27, introduced through line 28 into distilling column 29 to be purified therein by distillation. Pure epoxide which passed over as the head product through line 30 was condensed in cooler 31 and withdrawn through line 32. A portion of the condensed matter was refluxed through line 33 to distilling column 29, and distillation residues obtained in the sump portion of column 29 were removed through line 34.

A further exemplary mode of executing the process of the present invention comprises disposing reaction chambers 1 and 2, arranged one above the other in reactor 3, in two separate reactors, which would merely mean adding a further reactor to the flow scheme described above.

EXAMPLE 1

Propoylene oxide was produced by the process illustrated in the accompanying flow scheme by charging the reactor 3, per hour, with 1680 grams of 40 mols propylene together with 676 grams or 8.9 mols peracetic acid, which was used as a 20% solution in ethyl acetate, and the reaction components were reacted with one another in two reaction stages. The reactor was 360 mm. long and 150 mm. wide. In the first stage, the reaction was allowed to proceed at a temperature of 50° C., and in the second stage it was allowed to proceed at 100° C., a pressure of 100 atmospheres absolute being maintained in the two stages. The reaction mixture was allowed to remain in the first and second stage for a period of 50 and 10 minutes, respectively. Reaction mixture was removed at the head of the reactor at the same rate as starting components were supplied thereto. The pressure was reduced to 2.5 atmospheres absolute and the reaction mixture was introduced into distilling column 17 to separate propylene in excess. The propylene was expelled at a temperature of 90° C. in the still of column 17, condensed in cooler 20 at a temperature of −50° C., and then recycled while liquid to reactor 3. The distillation residue which consisted predominantly of crude propylene oxide, acetic acid and solvent, was subjected to fractional distillation at atmospheric pressure in column 17. 402 grams, per hour, propylene oxide boiling at 33–35° C. were removed at the head of the column. This corresponded to a yield of 77.9%, referred to the amount of peracetic acid used, or to a yield of 77.1%, referred to propylene which underwent conversion; 22.5% propylene and 96% peracetic acid underwent conversion.

EXAMPLE 2

The experiment described in Example 1 was repeated save that the ethyl acetate was replaced with acetone as a solvent for the peracetic acid. Propylene oxide was obtained in a yield of 362 grams per hour, corresponding to a yield of 70.1%, referred to the amount of peracetic acid used, or to 73%, referred to the propylene which underwent conversion. 21.4% of the propylene and 97% of the peracetic acid used had undergone conversion during the same period of time. As compared with ethyl acetate, acetone as the solvent incurred a reduced yield.

EXAMPLE 3

The experiment described in Example 1 was repeated save that a reactor made exclusively of stainless steel (V4A) but with no aluminum was used. The following results were obtained:

| | |
|---|---|
| Propylene oxide obtained per hour _____grams__ | 358 |
| Propylene oxide yield, referred to peracetic acid percent__ | 69.5 |
| Propylene oxide yield, referred to propylene transformed _____do____ | 78 |
| Peracetic acid conversion rate _____do____ | 98 |
| Propylene conversion rate _____do____ | 19.8 |

Distillation residue was obtained at a rate of 0.3 kg. per kg. propylene oxide produced, and $CO_2$ was evolved at a rate of 13%, referred to 1 carbon atom of the peracetic acid. 1 part per million $FeCl_3$, referred to the peracetic acid solution, was introduced into the reaction mixture as the stainless steel underwent corrosion. This corresponded to a corrosion rate of 1.1 g./m.$^2$ a day which was sufficient to initiate catalytic decomposition of the peracetic acid. Stabilization e.g. with phosphoric acid or another complex former proved inefficient.

EXAMPLE 4

The experiment described in Example 1 was repeated save that a peracetic acid solution was used which had ben stabilized with 0.01% by weight sodium tripolyphosphate ($Na_6P_3O_{10}$) and with 0.01% by weight quinoline. The following results were obtained:

| | |
|---|---|
| Propylene oxide obtained per hour _____grams__ | 465 |
| Propylene oxide yield, referred to peracetic acid percent__ | 90.1 |
| Propylene oxide yield, referred to propylene transformed _____do____ | 87.8 |
| Peracetic acid conversion rate _____do____ | 97 |
| Propylene conversion rate _____do____ | 22.8 |

In the absence of quinoline, the $Na_5P_3O_{10}$ enabled no yield, increased with respect to that obtained in Example 1, to be obtained.

EXAMPLE 5

3,420 grams isobutylene (61 mols) and 4,940 grams of a 20% by weight solution of peracetic acid in ethyl acetate, which had been stabilized with 0.01% by weight tripolyphosphate and 0.01% by weight quinoline, were reacted per hour in the manner shown in the accompanying flow scheme. The isobutylene and peracetic acid were used in the molar ratio of 4:7:1. The temperature was maintained at 30° C. in the first reaction stage of reactor 3, and the reaction mixture was allowed to remain therein for a period of 30 minutes, and maintained at 70° C. in the second reaction stage while the reaction mixture was allowed to remain therein for a period of 6 minutes. The pressure prevailing inside the reactor was adjusted to 2 atmospheres (gauge pressure) by means of a pressure valve. Reaction product leaving the reactor was expanded to atmospheric pressure, isobutylene in excess was successively distilled off in a column series-connected to the reactor, and recycled to the reactor. The distillation residue obtained in the sump portion of the column, which contained all the isobutylene oxide, was removed and purified by distillation in a still further column. Gas chromatographical analysis and the pyridine/HCl-method indicated that the fraction boiling at 51–52° C. was pure isobutylene oxide. The isobutylene oxide was obtained in a yield of 825 grams or 88.2%, referred to the amount of peracetic acid used.

We claim:

1. A process for the continuous manufacture of epoxy compounds from olefins, which are gaseous at ambient temperature and at atmospheric pressure, by oxidation with peracetic acid in the liquid phase which comprises reacting in two reaction stages an about 10–40% by weight solution of peracetic acid, which is free from water and mineral acid, in an inert organic solvent with an appropriate olefin in the molar ratio of 1:4 to 5, at a temperature of about 20 to about 100° C. and under a pressure of about 3 to about 100 atmospheres absolute, by allowing the peracetic acid, in the first reaction stage, to act upon the olefin at a temperature below about 60° C. for a period of time sufficient to transform about 55–80% by weight of the peracetic acid, and thereafter completing the reaction, in the second reaction stage, at a temperature above 60° C., within a period of about 5 to 20 minutes, so as to obtain a maximum peracetic acid conversion rate, then expanding reaction mixture and expelling olefin in excess by evaporation, recycling the expelled olefin and reacting it again with peracetic acid, and isolating resulting epoxy compound from residue by subjecting the said residue to fractional distillation.

2. A process as claimed in claim 1, wherein the inert organic solvent is at least one member selected from the group consisting of acetone, methyl acetate and ethyl acetate.

3. A process as claimed in claim 1, wherein the olefinic component is at least one member selected from the group consisting of propylene, butene-1, butene-2, isobutylene and 3-methylbutene-1.

4. A process as claimed in claim 1, wherein the reaction temperature in the first reaction stage is maintained at about 30–50° C. and is maintained in the second reaction stage at about 70–90° C.

5. A process as claimed in claim 1, wherein the peracetic acid is stabilized by means of a mixture formed of sodium tripolyphosphate and quinoline, the mixture being used in a proportion of 0.01 to 1% by weight.

6. A process as claimed in claim 1 wherein the peracetic acid in the first reaction stage acts upon the olefin for a period of about 30 to 50 minutes.

References Cited

UNITED STATES PATENTS

| | | | |
|---|---|---|---|
| 3,278,562 | 10/1966 | Thigpen et al. | 260—348.5 |
| 3,321,493 | 5/1967 | Beesley et al. | 260—348.5 |
| 3,228,977 | 1/1966 | Sennewald et al. | 260—502 |

FOREIGN PATENTS

| | | |
|---|---|---|
| 641,625 | 6/1964 | Belgium. |
| 900,836 | 7/1962 | Great Britain. |

NORMA S. MILESTONE, Primary Examiner

PO-1050
(5/69)

UNITED STATES PATENT OFFICE
CERTIFICATE OF CORRECTION

Patent No. 3,476,776          Dated November 4, 1969

Inventor(s) Kurt Sennewald, Heinz Erpenbach, Heinrich Rehberg, and Gunter Viertel It is certified that error appears in the above-identified patent and that said Letters Patent are hereby corrected as shown below:

Column 4, in Example 1, line 60, cancel "17" and insert -- 29 --.

Column 5, in Example 5, line 54, cancel "4:7:1" and insert -- 4.7:1 --.

SIGNED AND SEALED
SEP 8 - 1970

(SEAL)
Attest:

Edward M. Fletcher, Jr.
Attesting Officer

WILLIAM E. SCHUYLER, JR.
Commissioner of Patents